United States Patent Office 3,087,914
Patented Apr. 30, 1963

3,087,914
PROCESS FOR THE PREPARATION OF POLYMERS CONTAINING AMIDOXIME GROUPS
Ferdinand Leonard Schouteden, Wilrijk-Antwerp, Belgium, assignor to Gevaert Photo-Producten N.V., Mortsel, Belgium, a Belgian company
No Drawing. Filed June 30, 1959, Ser. No. 823,811
Claims priority, application Belgium July 1, 1958
6 Claims. (Cl. 260—78.4)

The present invention relates to the preparation of polymers, more particularly to the conversion of nitrile groups in polymeric material, with hydroxylamine.

It is known to treat in non aqueous medium nitrile groups containing polymers, with hydroxylamine whereby the reacted nitrile groups are converted into amidoxime groups (Makromolek. Chem. 24, 25 (1957)).

It is likewise known that the dyeing characteristics of polyacrylonitrile products can be improved by treating these products with a warm aqueous hydroxylamine solution at a pH value comprised between 7 and 10.

It is also known that treating polyacrylonitrile with an aqueous hydroxylamine solution results in the conversion of the nitrile groups into hydroxamic acid groups (Chim. & Ind. 79, 754 (1958)). As was pointed out in this paper, although the nitrile groups are primarily converted into amidoxime groups, the amidoxime groups are converted into hydroxamic acid groups.

Further it is known that polyacrylamidoximes can be hydrolyzed to polymers containing hydroxamic acid groups.

Polyacrylonitrile is only soluble in a very limited number of organic solvents, the best known of which is dimethylformamide; it is also soluble in concentrated aqueous salt solutions (cf. U.S. Patent 2,605,246) and in concentrated aqueous solutions of inorganic and some organic rhodanides (cf. U.S. Patents 2,533,224 and 2,605,246).

It is an object of the present invention to convert the nitrile groups in polymers such as polyacrylonitrile, polyvinylidenecyanide into amidoxime groups to form products with new useful properties.

It is a further object of this invention to enhance the reactivity of said polymers against compounds such as dyes.

Further objects will appear from the following description and examples.

Now I have found that by reacting hydroxylamine in aqueous medium with polymers containing nitrile groups, polymers having amidoxime groups are obtained if this reaction is carried out in concentrated aqueous salt solutions. Said new polymeric compounds have a modified solubility, an enhanced reactivity and a wide range of new useful applications.

As suitable salts for the preparation of the reaction medium can be mentioned: zinc chloride, calcium chloride, lithium chloride, cadmium bromide, cadmium iodide, sodium rhodanide, zinc rhodanide, aluminium perchlorate, calcium perchlorate, calcium nitrate, guanidine rhodanide, mono- and dialkyl-substituted guanidine rhodanide. Depending upon the nature and the concentration of the salt used, the polymer will be swollen or dissolved and the ratio of amidoxime groups to hydroxamic acid groups will be different.

In the execution of the method according to the present invention homopolymers and copolymers of acrylonitrile, methacrylonitrile and vinylidene cyanide are considered as starting products. In case of copolymers, polymers are used which besides other copolymerizable monomeric compounds contain mainly monomeric units with nitrile groups. Under copolymers we understand those which were obtained by ordinary copolymerization, as well as by block copolymerization or by graft copolymerization. The invention is not limited to polymeric products consisting of monomeric units containing nitrile groups; likewise cyanoethylated polymers for instance cyanoethylated cellulose may be used.

The hydroxylamine can be used as such or in the form of its different known salts, which may be neutralized wholly or partly, gradually or at once in the reaction medium. Instead of hydroxylamine salts, also hydroxylamine-forming compounds can be used, such as e.g. ammonium hypochlorite or sodium nitrite in the presence of reducing agents.

Although the reaction takes place already at room temperature, it is in most cases preferable to act between 50 and 100° C. but if desired also higher temperatures can be used, whilst the action under a pressure higher than the atmospheric pressure also involves certain advantages.

Analogously to treatment in anhydrous organic medium where the nitrile groups are transformed into amidoxime groups the reaction with hydroxylamine in concentrated aqueous solutions of organic or inorganic salts gives polymers soluble in alkaline aqueous solution such as sodium hydroxide and in acid solution. The immediate reaction product is a polymer containing amidoxime groups and in some circumstances also hydroxamic acid groups.

The solubility of the products obtained according to the present invention also depends upon the degree of conversion of the nitrile groups and further upon the ratio of amidoxime groups versus hydroxamic acid groups.

These reaction products are of particular importance since the formation of amidoxime groups and hydroxamic acid groups may be accompanied or followed by other reactions wherein one or more other functional groups, likewise present in the macromolecular substance, are involved.

These polymers can be used particularly in the preparation of paper, either as a modifying agent for the paper pulp or as an impregnating agent of the paper band formed. Added to colloidal solutions they have a marked influence on the rheological properties of these solutions. So the products containing mainly amidoxime side groups are compatible with aqueous solutions of gelatin, polyvinyl alcohol and polyvinyl pyrrolidone. They alter the viscosity and gelling temperature of the primary solutions. They may be added to coating compositions in order to alter the surface properties of these compositions. Their ability to bind or to fix different chemical substances makes them very useful particularly in elements where diffusion of chemical substances, such as dyes and colors have a disadvantageous effect on the quality of the product. Especially in photography, they can be used in the light-sensitive emulsion layer, or other auxiliary layers, such as filter layers, antihalation layers, antistress layers etc.

The following examples illustrate the present invention without limiting, however, the scope thereof.

*Example 1*

2 g. of polyacrylonitrile are dissolved, whilst stirring, in a warm solution of 85 g. ammonium rhodanide in 36 cm.³ of water. To this solution are added 8.5 g. of hydroxylamine hydrochloride and 6 g. of anhydrous sodium carbonate. After 4 hours' heating at 95° C., the reaction mass is poured out into a great excess of water and repeatedly washed with water. The polymer is soluble in diluted aqueous sodium hydroxide and hydrogen chloride solutions.

*Example 2*

5 g. of polyacrylonitrile powder are dissolved, whilst stirring, in a warm solution (70° C.) consisting of 25 cm.³ of water and 35 g. of potassium rhodanide. This solution is cooled at room temperature and then 10 g. of hydroxylamine hydrochloride and 7.5 g. of anhydrous sodium carbonate are gradually added. After 3 h. of reaction at 75° C., the solution is diluted with 150 cm.³ of water. By addition of normal hydrochloric acid the polymer deposits. This polymer is thoroughly washed with water until it is freed from rhodanide ions, treated with methanol and dried. The polymer swells in normal hydrochloric acid and completely dissolves in normal sodium hydroxide. By hydrolysis in hydrochloric acid 4 N the polymer liberates 9.9 meq./g. of ammonia and 8.7 meq./g. of hydroxylamine. These analyses correspond with those of a polymer containing 38% hydroxamic acid groups, 37% amidoxime groups and 25% nitrile groups.

*Example 3*

10 g. of Orlon-42 fibers (staple fibers manufactured from a polyacrylonitrile copolymer) are dissolved after washing in an Hostapon-solution (Hostapon is a trade name for a wetting agent which is Hostapon T solution: sodium oleylmethyltauride, J. P. Sisley. Index des Huiles sulfonees et Detergents modernes, Tome II, p. 368, Paris. 1954) at 90° C., in a solution of 100 g. of zinc chloride in 70 cm.³ of water. To this solution are added 1 g. of hydroxylamine hydrochloride and 0.5 g. of anhydrous sodium carbonate. After heating for ½ h. at 90° C., the solution is poured out into a great excess of water, repeatedly rinsed with water, sucked off and dried. Contrary to the starting product, the polymer is insoluble in dimethyl formamide but dissolves in a 5% sodium hydroxide aqueous solution.

*Example 4*

5 g. of Darlan-fibers (a vinylidene cyanide copolymer) are dissolved in a warm solution of 15 cm.³ of water and 50 g. of guanidine rhodanide. To this solution is added 1 g. of hydroxylamine sulphate and the whole is heated for 1½ h. at 95° C. Similarly to the methods described in the U.S. Patent 2,558,730, the solution is poured out on a glass plate, and after completely cooling washed for ¼ h. in water at about 2° C., and subsequently for ½ h. at 50° C., and finally dried at 100° C. The film thus obtained is pale-yellow colored but can be dyed very easily with acid dye-stuffs.

I claim:

1. In the process for producing high polymers characterized by a plurality of amidoxime groups which comprises heating in an aqueous medium a high polymer selected from the group consisting of a polymer of acrylonitrile, a polymer of methacrylonitrile, a polymer of vinylidene cyanide, cyanoethylated polyvinyl alcohol, cyanoethylated cellulose, cyanoethylated polyvinyl amine, cyanoethylated polyacrylamide and cyanoethylated polymethacrylamide with an hydroxylamine salt, sufficient to theoretically transform substantially all of the —CN groups with the formation of amidoxime groups, there being added to the reaction medium no more alkali than necessary to free the hydroxylamine, the improvement which comprises carrying out the reaction in a concentrated aqueous solution of a water-soluble salt.

2. The improved process of claim 1 wherein the reaction is carried out from about 50–100° C.

3. The improved process of claim 1 wherein the solution of water-soluble salt is a rhodanide salt.

4. In a process for producing high polymers characterized by a plurality of amidoxime groups which comprises heating in an aqueous medium a high polymer selected from the group consisting of a polymer of acrylonitrile, a polymer of methacrylonitrile, a polymer of vinylidene cyanide, cyanoethylated polyvinyl alcohol, cyanoethylated cellulose, cyanoethylated polyvinyl amine, cyanoethylated polyacrylamide and cyanoethylated polymethacrylamide with free hydroxylamine, sufficient to theoretically transform substantially all of the —CN groups, with the formation of amidoxime groups, the improvement which comprises carrying out the reaction in a concentrated aqueous solution of a water-soluble salt.

5. The improved process of claim 4 wherein the reaction is carried out from about 50–100° C.

6. The improved process of claim 4 wherein the solution of water-soluble salt is a rhodanide salt.

References Cited in the file of this patent

UNITED STATES PATENTS

| | | |
|---|---|---|
| 2,533,224 | Cresswell | Dec. 12, 1950 |
| 2,605,246 | Cresswell et al. | July 29, 1952 |
| 2,644,803 | Cresswell | July 7, 1953 |
| 2,648,646 | Stanton et al. | Aug. 11, 1953 |
| 2,670,268 | Stanton et al. | Feb. 23, 1954 |
| 2,937,067 | Khachoyan | May 17, 1960 |
| 2,959,574 | Woodberry | Nov. 8, 1960 |

FOREIGN PATENTS

| | | |
|---|---|---|
| 786,960 | Great Britain | Nov. 27, 1957 |

OTHER REFERENCES

Schildknecht: "Vinyl and Related Polymers," John Wiley and Sons, New York, 1952, pages 270–271 relied on.

Smith: "Vinyl Resins," Reinhold, New York, 1958 (pages 52–53 relied on).